US012705514B2

(12) United States Patent
Balasubramanian

(10) Patent No.: US 12,705,514 B2
(45) Date of Patent: Aug. 11, 2026

(54) METHOD FOR SIMULATION ASSISTED DATA GENERATION AND DEEP LEARNING INTELLIGENCE CREATION IN NON-DESTRUCTIVE EVALUATION SYSTEMS

(71) Applicant: INDIAN INSTITUTE OF TECHNOLOGY MADRAS (IIT MADRAS), Chennai (IN)

(72) Inventor: Krishnan Balasubramanian, Chennai (IN)

(73) Assignee: INDIAN INSTITUTE OF TECHNOLOGY MADRAS (IIT MADRAS), Tamil Nadu (IN)

( * ) Notice: Subject to any disclaimer, the term of this patent is extended or adjusted under 35 U.S.C. 154(b) by 1132 days.

(21) Appl. No.: 17/597,375

(22) PCT Filed: Jul. 9, 2020

(86) PCT No.: PCT/IN2020/050597
§ 371 (c)(1),
(2) Date: Jan. 4, 2022

(87) PCT Pub. No.: WO2021/005624
PCT Pub. Date: Jan. 14, 2021

(65) Prior Publication Data

US 2022/0253735 A1 Aug. 11, 2022

(30) Foreign Application Priority Data

Jul. 11, 2019 (IN) ............................ 201941027800

(51) Int. Cl.
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
CPC .......... G06N 7/01; G06N 20/00; G01N 29/04; G01N 29/0654; G01N 29/4472; G01N 29/4481; G01N 29/449
See application file for complete search history.

(56) References Cited

U.S. PATENT DOCUMENTS

2012/0226476 A1 9/2012 Shingaki et al.
2017/0030863 A1* 2/2017 Holmes ............. G01N 29/2468
(Continued)

FOREIGN PATENT DOCUMENTS

JP 5509210 B2 6/2014
JP 2018185311 A1 11/2018

OTHER PUBLICATIONS

International Search Report and Written Opinion; International Patent Application No. PCT/IN2020/050597, Oct. 1, 2020 (9 pages).

*Primary Examiner* — Sanchita Roy
(74) *Attorney, Agent, or Firm* — HSML P.C.

(57) ABSTRACT

Method and system for detecting one or more anomalies in an object are provided. The system receives experimental data of the object and applies a probability density function (PDF) upon one or more variables associated with the experimental data to determine corresponding one or more PDF estimates. The system further generates simulated data associated with the object based on at least one of the one or more PDF estimates and priori data associated with the testing of the object. The simulated data comprises one or more new anomalies unknown in the experimental data along with the one or more anomalies of the experimental data. Furthermore, the system trains a learning model based on the one or more new anomalies and the one or more (Continued)

anomalies of the experimental data. The learning model is applied for detecting any anomaly in an object.

20 Claims, 4 Drawing Sheets

(56) References Cited

U.S. PATENT DOCUMENTS

| | | | | |
|---|---|---|---|---|
| 2017/0177997 | A1* | 6/2017 | Karlinsky | G06N 3/08 |
| 2018/0330253 | A1* | 11/2018 | Gottschlich | G06N 20/00 |
| 2020/0371512 | A1* | 11/2020 | Srinivasamurthy | G06V 20/70 |
| 2021/0270755 | A1* | 9/2021 | De Beenhouwer | G06N 20/00 |

* cited by examiner

METHOD FOR SIMULATION ASSISTED DATA GENERATION AND DEEP LEARNING INTELLIGENCE CREATION IN NON-DESTRUCTIVE EVALUATION SYSTEMS

The following specification particularly describes the invention and the manner in which it is to be performed.

TECHNICAL FIELD

The present disclosure relates to a field of Non-destructive Testing/Evaluation (NDE/NDT) of objects. More particularly, but not exclusively, the present disclosure describes a system and method for automatically identifying one or more anomalies in the objects.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, the NDE/NDT is very useful in various medical and industrial applications for evaluating/testing structure of an object. The NDE/NDT plays a vital role in improving the manufacturing productivity and quality. A number of NDT/NDE inspection techniques such as feature-based classification, artificial neural networks and adaptive filtering have been developed to perform automatic radiographic inspections of the objects. However, application of these techniques is restricted due to lack of sufficient training data to train the NDE/NDT system to perform defect identification. This leads to inefficient implementation of these NDT/NDE techniques.

It would therefore be desirable to develop an efficient NDT/NDE technique for automatically detecting anomalies in objects. Therefore, there exists a need in the art for a technique that ensures availability of sufficient training data to train a learning model which may be integrated with the NDE/NDT system.

SUMMARY

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, a method for detecting one or more anomalies in an object is disclosed. The method comprises receiving experimental data of the object obtained while testing one or more anomalies in the object. The experimental data is associated with predefined anomaly types of the object. The method further comprises applying a probability density function (PDF) upon one or more variables associated with the experimental data to determine corresponding one or more PDF estimates. The one or more variables either extrapolates or interpolates the experimental data such that variations and sources of variations in the experimental data is detected upon the application of the PDF. Further, the method comprises generating simulated data associated with the object based on at least one of the one or more PDF estimates and priori data associated with the testing of the object. The simulated data comprises one or more new anomalies unknown in the experimental data along with the one or more anomalies of the experimental data. Further, the method comprises training a learning model based on the one or more new anomalies determined in the simulated data and the one or more anomalies of the experimental data. The learning model is applied for detecting any anomaly in a new object related to the object for whom the learning model is trained.

In yet another non-limiting embodiment of the present disclosure, a system for detecting one or more anomalies in an object is disclosed. The system comprises a receiving unit configured to receive experimental data of the object, wherein the experimental data is obtained while testing one or more anomalies in the object. The experimental data is associated with predefined anomaly types of the object. The system further comprises at least a processing unit configured to apply a probability density function (PDF) upon one or more variables associated with the experimental data to determine corresponding one or more PDF estimates. The one or more variables either extrapolates or interpolates the experimental data such that variations and sources of variations in the experimental data is detected upon the application of the PDF. The at least one processing unit further generates simulated data associated with the object based on at least one of the one or more PDF estimates and priori data associated with the testing of the object. The simulated data comprises one or more new anomalies unknown in the experimental data along with the one or more anomalies of the experimental data. Furthermore, the at least one processing unit trains a learning model based on the one or more new anomalies determined in the simulated data and the one or more anomalies of the experimental data. The learning model is applied for detecting any anomaly in a new object related to the object for whom the learning model is trained.

OBJECTS OF THE INVENTION

An object of the present invention is to enhance the automation of detecting anomalies in the object using the NDE/NDT.

Another object of the present invention is to provide techniques for generating large and relevant data for training artificial intelligence networks (such as Deep Learning and/or Machine Learning) for the NDE/NDT system.

Yet another object of the present invention is to improve the accuracy and efficiency of the NDE/NDT process.

BRIEF DESCRIPTION OF THE ACCOMPANYING DRAWINGS

The features, nature, and advantages of the present disclosure will become more apparent from the detailed description set forth below when taken in conjunction with the drawings in which like reference characters identify correspondingly throughout. Some embodiments of system and/or methods in accordance with embodiments of the present subject matter are now described, by way of example only, and with reference to the accompanying figures, in which.

Figure 1:
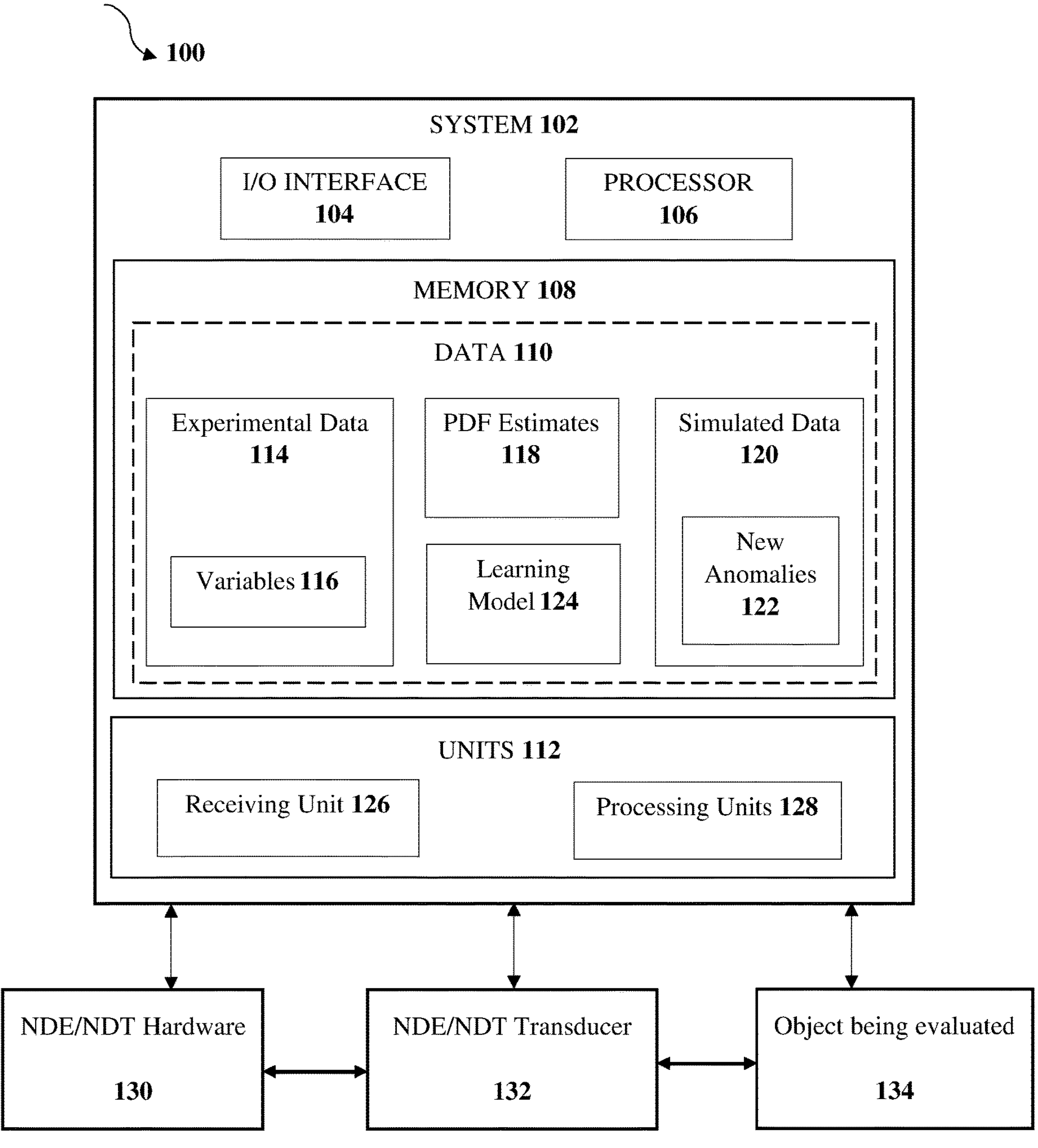
FIG. 1 shows a block diagram illustrating a network illustrating a system for detecting one or more anomalies in an object in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word “exemplary” is used herein to mean “serving as an example, instance, or illustration”. Any embodiment or implementation of the present subject-matter described herein as “exemplary” is not necessarily to be construed as preferred or advantageous over other embodiments.

While the disclosure is susceptible to various modifications and alternative forms, specific embodiments thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms “comprises”, “comprising”, “include(s)”, or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus proceeded by “comprises . . . a” does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure will be described herein below with reference to the accompanying drawings. In the following description, well known functions or constructions are not described in detail since they would obscure the description with unnecessary detail.

The present disclosure relates to a system for detecting one or more anomalies in an object. The object may include, but not limited to, any part, product, weld, system, instrument, component. The system utilizes a large volume of training data to train a leaning network such as deep learning and/or machine learning networks to automatically detect, characterize, or measure the presence of the anomalies and to locate and determine the features of the anomalies such as size, shape, and orientation. The one or more anomalies may comprise one or more defects, imperfections, and abnormalities in the object. The system trains the learning model using the large volume of data which is generated based on limited experimental data. The experimental data is obtained while testing one or more anomalies in the object, and the experimental data is associated with predefined anomaly types of the object. The system ensures that the NDE/NDT process are implemented more efficiently such that one or more anomalies in the object are detected more accurately and efficiently.

Referring to FIG. 1, an exemplary network 100 is disclosed illustrating setup for detecting the one more anomalies in an object in accordance with an embodiment of the present disclosure. The network 100 may include system 102 connected with an NDE/NDT hardware 130, an NDE/NDT transducer 132 and object being evaluated 134. The system 102 comprises an input/output interface 104, a processor 106, a memory 108 and various units 112. The I/O interface 104 may include a variety of software and hardware interfaces, for example, a web interface, a graphical user interface, input device, output device and the like. The I/O interface 104 may allow the system 102 to interact with users directly or through other devices. The memory 108 is communicatively coupled to the processor 106. Further, the memory 108 comprises data 110 such as experimental data 114 further comprising one or more variables 116, PDF estimates 118, simulated data 120 further comprising new anomalies 122 detected, and a learning model 124. Further, the units 112 comprises a receiving unit 126 and one or more processing units 128. These units may be dedicated hardware units capable of performing various operations of the system 102. However, according to an embodiment, the units 126-128 may a processor or an application-specific integrated circuit (ASIC) or any circuitry capable of executing instructions stored in the memory 108 of the system 102.

The object to be tested may be any of part, product, weld, system, instrument, component, etc, but not limited. The NDE/NDT hardware 130 may be any hardware which may implement the NDE/NDT process. The NDE/NDT process may be any of following such as Radiography Testing, Ultrasonic Phased Array Imaging, Liquid Penetrant Testing, Magnetic Particle Testing, and Active Infrared Imaging, etc., but not limited thereto. Thus, the NDE/NDT hardware 130 may be any instrument for carrying out the above mentioned NDE/NDT processes.

The NDE/NDT transducer 132 may be a transducer which is used to convert one form of energy into another for implementing the NDE/NDT process. For example, the NDE/NDT transducer may be an ultrasonic transducer which can be used for thickness gaging and conventional flaw detection or may be phased array probes that utilize multiple elements to generate steered sound beams to detect the one or more anomalies in the object.

In an exemplary embodiment, the system 102 trains the learning model 124 using the large volume of training data which is generated using the experimental data 114, which is very limited. According to an embodiment, the receiving unit 126 receives the experimental data 114 of the object either from external sources or from memory 108 itself. The experimental data 114 is obtained while testing one or more anomalies in the object. The experimental data 114 is associated with predefined anomaly types of the object which are detected during the testing. The experimental data may comprise any of following such as 1D data, 2D data (x-y data or x-t data), 3D volumetric data (x-y-z data or x-y-t data) and 4D time-stamped data (x-y-z-t data). In a non-limiting exemplary embodiment, the data may also be in form of images.

The processing unit 128 may process the experimental data 114 of the object to generate the large volume of data to train the learning model 124 for the NDE/NDT. The large volume of data is generated based on the experimental data 114 and one or more variables which affects the testing and evaluation of the object. The processing unit 128 may apply a probability density function (PDF) upon each of one or more variables 116 associated with the experimental data 114 to determine corresponding one or more PDF estimates 118. The one or more variables 116 either extrapolates or interpolates the experimental data 114 such that variations/errors and sources of variations/errors in the experimental data 114 is detected upon the application of the PDF. The one or more variables 116 may comprise at least one of an instrument noise, experimental variation, transducer sensitivity variations, expected defect morphologies, and defect probabilities, precision, accuracy of the measurement, etc., but not limited thereto.

Further, the processing unit 128 may generate the large volume of simulated data 120 associated with the object using the at least one of the one or more PDF estimates 118 and priori data associated with the testing of the object. The processing unit 128 may perform simulations based on the experimental data 114 and the estimated PDFs 118 of the one or more variables 116 to generate the large volume of simulated data 120. The simulated data 120 comprises one or more new anomalies 122 which were unknown in the experimental data 114 along with the one or more anomalies of the experimental data 114.

Further, the processing unit 128 may train the learning model 124 (deep learning and/or machine learning networks) based on the one or more new anomalies 122 determined in the simulated data 120 and the one or more anomalies of the experimental data 114. Further, the priori data may be received from external sources or may be derived from the experimental data 114. The priori data comprises one or more reference information which indicates the characteristics of the object. In an exemplary embodiment, the priori data may be a computer-aided design (CAD) model or any expert information which may indicate the characteristics of the object.

Further, the processing unit 128 may validate the trained learning model 124 before deploying the same for the evaluation of the objects. The processing unit 128 may use a portion of the experimental data 114 of the object for validating the trained learning model 124. If the learning model 124 is validated successfully then it may be applied for detecting any anomaly in new objects related to the object for whom the learning model is trained. Otherwise, feedback is provided to train the learning model 124 again. The learning model 124 may be applied to detect anomalies in the object which have similar characteristics, features, structure, or are of same category as of the object based on which the learning model 124 is trained.

Figure 2:
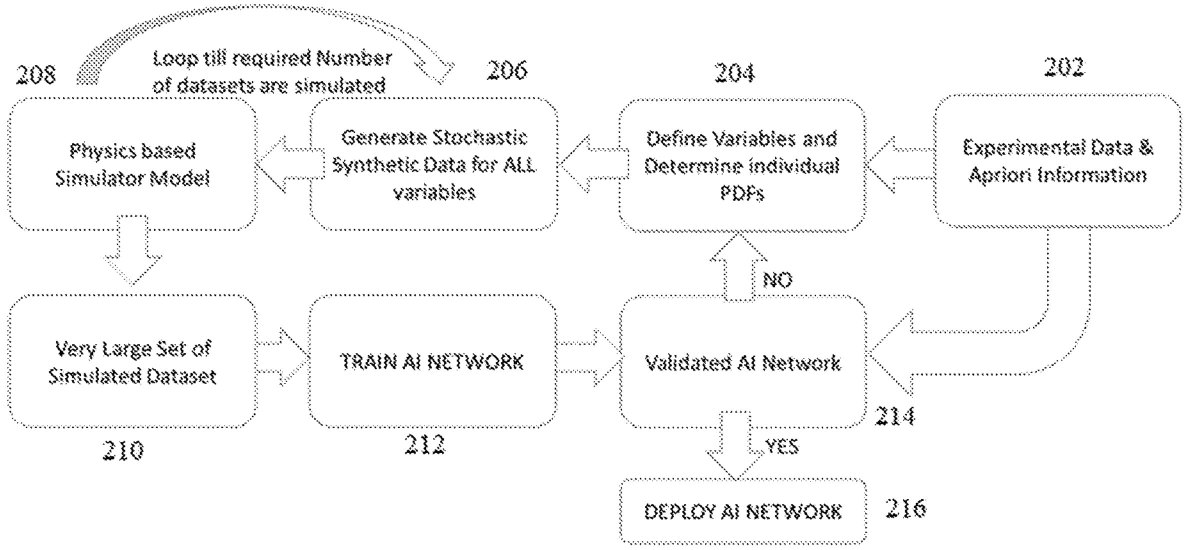
FIG. 2 shows a block diagram illustrating flow of information for explaining working of the system in accordance with an embodiment of the present disclosure.

Flow of information within the system 102 is illustrated in FIG. 2 of the present disclosure. At block 202, the experimental data 114 and priori information is indicated, which is then utilized to define one or more variables 116 as shown at block 204. At block 204, the probability density function (PDF) for each of the one or more variables is applied to determine corresponding PDF estimates 118. The PDFs for one or more variables 116 are utilized to generate the stochastic synthetic data for the one or more variables as shown at block 206. The stochastic synthetic data for one or more variable comprises variations in the experimental data 114 which is detected upon the application of the PDF.

The stochastic synthetic data of one or more variables is fed to the simulator model shown at block 208, which generates the large volume of simulated data 120 as shown at block 210. The simulated data 120 is used to train the learning model/networks 124, as shown at block 212. Further, the trained leaning model/network 124 is validated using a portion of the experimental data 114 as shown at block 214. If the trained learning model/network 124 is not validated, the process returns at block 204, otherwise the trained learning model/network 124 is deployed by integrating with NDE/NDT hardware to detect one or more anomalies in the object.

In this manner, the learning model/network 124 is trained using the large set of simulated data 120 which is generated based on the experimental data 114. The trained learning model/network 124 integrated with the hardware automatically detects the one or more anomalies in the object efficiently and more accurately. Thus, the system 102 implements the NDE/NDT process in an efficient manner which detects one or more anomalies automatically.

Figure 3:
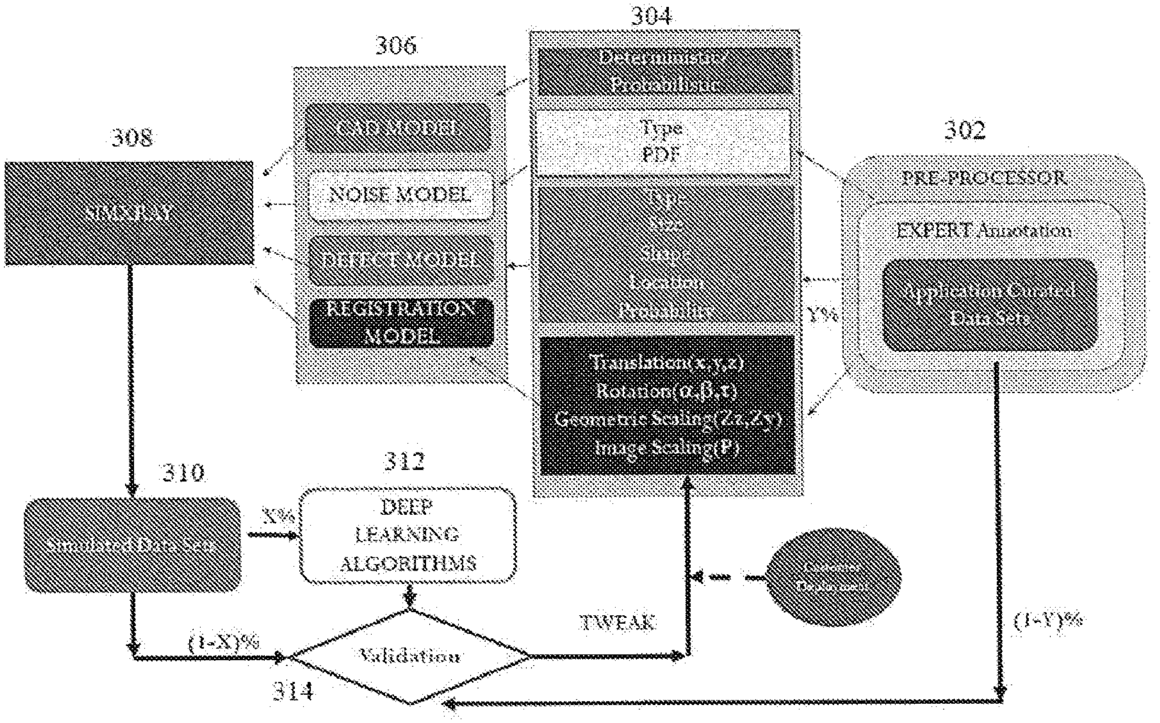
FIG. 3 shows a block diagram illustrating flow of information for explaining working of the system in accordance with an embodiment of the present disclosure.

For explaining the above defined embodiments, let us consider Digital Radiography NDE/NDT system where learning model 124 is applied for deep learning on X-Ray images for detecting porosity defects in components manufactured by casting. FIG. 3 illustrates flow chart that provides the detailed description of the flow of information for Simulation Assisted Automatic Defect Recognition (ADR) for the Digital Radiography NDE/NDT system. At block 302, a pre-processor is shown which stores expert annotation data which comprise application curated data sets.

This data is fed to block 304 which defines PDFs of each of one or more variables 116 which are defined by various elements of defects. The variables 116 may be any location, shape, probability, and size of defect. Accordingly, the one or more elements may be radial distance, angular position, major axis, eccentricity, orientation, intensity, etc. The elements of defined one or more variables may be different for different components being evaluated. Further, the block 304 also defines one or more parameters for registration of image data of the component. The objective of image registration is to make the defect statistics independent of the variation in the position and orientation of the components across different images.

The PDFs may be defined by using mean and standard deviation as shown in table 1. The table 1 shown values of the mean and standard deviation for each PDF of corresponding one or more variables. The distribution type in the table defines the type of PDF. The PDF may be uniform and normal PDF as shown in table 1.

| | PDF | | |
|---|---|---|---|
| Variables | Mean | Standard Deviation | Distribution Type |
| Radial Distance | (547) | 32 | Normal |
| Angular Position | 2.0056 | 120.33 | Uniform |
| Major Axis | 9.443 | 2.863 | Normal |
| Eccentricity | 0.349 | 0.065 | Normal |
| Orientation | 15.428 | 70.172 | Uniform |
| Intensity | 0.0425 | 0.000833 | Normal |

The information of block 304 is fed to block 306 that define various models for generating simulated data 120 which are utilized by the simulator defined at block 308. The simulator at the block 308 generates a large set of simulated data 120 which is used for training the learning model 124 such as deep learning algorithm/network at block 310. The trained learning model 124 is then validated at block 312 using a portion of the experimental data 114. Based on the validation process, the trained learning model 124 is either tweaked to be improved or deployed to detect the one or more anomalies in the object.

Figure 4:
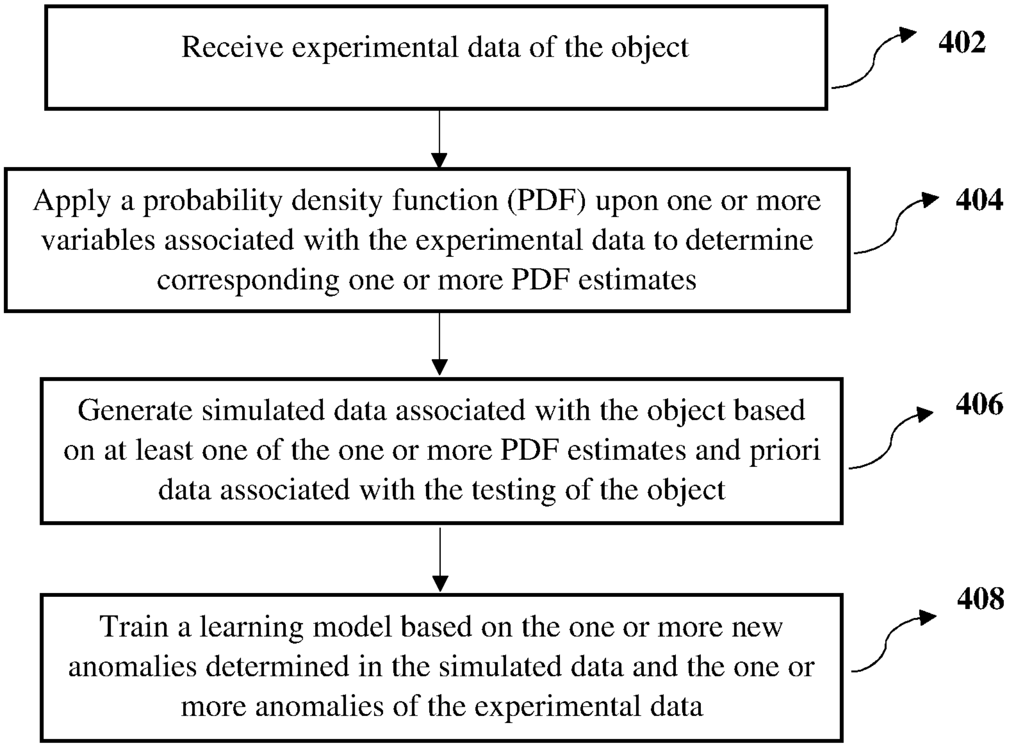
FIG. 4 shows a flow chart of a method for detecting one or more anomalies in an object in accordance with an embodiment of the present disclosure.

FIG. 4 shows a flow chart illustrating an exemplary method 400 for detecting one or more anomalies in an object. The object may be any part, product, weld, system, instrument, component, etc., but not limited thereto. The one or more anomalies may comprise one or more defects, imperfections, and abnormalities, but not limited thereto. At step 402, experimental data 114 of the object may be received by the system 102 via the receiving unit 126. The experimental data 114 is associated with predefined anomaly types of the object which is obtained while testing one or more anomalies in the object. The experimental data 114 may comprise at least one of 1D data, 2D data, 3D volumetric data and 4D time-stamped data.

At step 404, a probability density function (PDF) may be applied, by the processing unit 128, upon one or more variables 116 associated with the experimental data 114 to determine corresponding one or more PDF estimates 118. The one or more variables 116 either extrapolates or interpolates the experimental data 114 such that variations or errors and sources of variations or errors in the experimental data 114 is detected upon the application of the PDF. The one or more variables 116 comprises at least one of instrument noise, experimental variation, transducer sensitivity variations, expected defect morphologies, and defect probabilities, precision and accuracy of the measurement.

At step 406, the simulated data 120 associated with the object is generated by the processing unit 128 based on at least one of the one or more PDF estimates 118 and priori data associated with the testing of the object. The simulated data 120 comprises one or more new anomalies 122 unknown in the experimental data 114 along with the one or more anomalies of the experimental data 114. Further, the priori data comprises one or more reference information which indicates the characteristics of the object.

At step 408 of the method 400, a learning model 124 is trained based on the one or more new anomalies 122 determined in the simulated data 120 and the one or more anomalies of the experimental data 114. The learning model 124 may be a deep learning network and/or machine learning network. Once the learning model 124 is trained it may be applied for detecting any anomaly in a new objects related to the object for whom the learning model 124 is trained. In an embodiment, the learning model 124 may be validated using a portion of the experimental data 114 before deploying to detect the one or more anomalies in the objects.

In this manner, the system 102 may be train the learning model 124 to automatically detect the one or more anomalies in the objects. The system 102 may generate the large volume of simulated data 120 based on experimental data 114 to train the learning model 124, which replicates the real data defining one or more type of anomalies that were not present in the experimental data. Also, the system 102 may integrate the trained learning model 124 with the NDE hardware 130 to detect the anomalies more accurately and efficiently.

Advantages

Exemplary embodiments discussed above may provide certain advantages. Though not required to practice aspects of the disclosure, these advantages may include those provided by the following features.

In an embodiment, the present disclosure describes the system that may generate a large volume of data which defines one or more anomalies that may be present in an object.

In an embodiment, the present disclosure describes the system which automatically determines one or more anomalies in the object.

In an embodiment, the present disclosure describes the method to detect the one or more anomalies in more accurate and efficient manner.

In an embodiment, the present disclosure describes the system that takes a limited set of data defining few anomalies as an input and may provide a learning model that may detect a large number of anomalies of almost every possible anomaly type which may be present in the object.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The invention claimed is:

1. A method for detecting one or more anomalies in an object, the method comprising:

receiving experimental data of the object, wherein the experimental data is obtained while testing one or more anomalies in the object, and wherein the experimental data is associated with predefined anomaly types of the object;

applying a probability density function (PDF), representative of variability in the experimental data arising from measurement conditions, upon one or more variables associated with the experimental data to determine corresponding one or more PDF estimates, wherein the one or more variables correspond to measurement-system parameters affecting acquisition of the experimental data and comprise at least one of instrument noise, transducer sensitivity variation, and expected defect morphology parameters, wherein the PDF application identifies variations and sources of variations in the experimental data attributable to the one or more variables;

generating stochastic synthetic data corresponding to each of the one or more variables based on the corresponding one or more PDF estimates;

providing the stochastic synthetic data to a simulator model to generate simulated data associated with the object based on the stochastic synthetic data and priori data associated with testing of the object, wherein the simulated data is generated based on characteristics of the object indicated by the priori data, and wherein the simulated data comprises one or more statistically synthesized anomalies not present in the experimental data along with the one or more anomalies of the experimental data;

training a learning model based on the one or more statistically synthesized anomalies and the one or more anomalies of the experimental data;

validating the trained learning model using a portion of the experimental data of the object, and wherein the trained learning model is applied to detect anomalies in a new object related to the object, wherein the object is one of a part, a product, a weld, a system, an instrument, and a component, wherein the one or more anomalies include one of a size, shape, and orientation object, wherein the learning model is retrained based on a result of the validation, and wherein the one or more variables are defined based on registered experimental data such that defect statistics are independent of positional variation in the experimental data.

2. The method as claimed in claim 1, wherein the one or more variables further comprises at least one of experimental variation, defect probabilities, and precision and accuracy of the measurement.

3. The method as claimed in claim 1, wherein the experimental data comprises 1D data, 2D data, 3D volumetric data and 4D time-stamped data.

4. The method as claimed in claim 1, wherein the priori data comprises one or more characteristics of the object.

5. A system for detecting one or more anomalies in an object, the system comprising:

at least one processor; and a memory storing instructions that, when executed by the at least one processor, cause the system to:

receive experimental data of the object, wherein the experimental data is obtained while testing one or more anomalies in the object, and wherein the experimental data is associated with predefined anomaly types of the object;

apply a probability density function (PDF), representative of variability in the experimental data arising from measurement conditions, upon one or more variables associated with the experimental data to determine corresponding one or more PDF estimates, wherein the one or more variables correspond to measurement-system parameters affecting acquisition of the experimental data and comprise at least one of instrument noise, transducer sensitivity variation, and expected defect morphology parameters, wherein the PDF application identifies variations and sources of variations in the experimental data attributable to the one or more variables, generate stochastic synthetic data corresponding to each of the one or more variables based on the corresponding one or more PDF estimates;

provide the stochastic synthetic data to a simulator model to generate simulated data associated with the object based on the stochastic synthetic data and priori data associated with the testing of the object, wherein the simulated data is generated based on characteristics of the object indicated by the priori data, and wherein the simulated data comprises one or more statistically synthesized anomalies not present in the experimental data along with the one or more anomalies of the experimental data, train a learning model based on the one or more statistically synthesized anomalies and the one or more anomalies of the experimental data, validate the trained learning model using a portion of the experimental data of the object, and apply the trained learning model to detect anomalies in a new object related to the object, wherein the object is one of a part, a product, a weld, a system, an instrument, and a component, wherein the one or more anomalies include one of a size, shape, and orientation, wherein the learning model is retrained based on a result of the validation, and wherein the one or more variables are defined based on registered experimental data such that defect statistics are independent of positional variation in the experimental data.

6. The system as claimed in claim 5, wherein the one or more variables further comprises at least one of experimental variation, defect probabilities, and precision and accuracy of the measurement.

7. The system as claimed in claim 5, wherein the experimental data comprises 1D data, 2D data, 3D volumetric data and 4D time-stamped data.

8. The system as claimed in claim 5, wherein the priori data comprises one or more characteristics of the object.

9. The method as claimed in claim 1, wherein the one or more variables comprises at least one of instrument noise, transducer sensitivity variations, expected defect morphologies, and precision and accuracy of the measurement.

10. The method as claimed in claim 1, further comprising:

integrating the learning model with a non-destructive evaluation/testing (NDE/NDT) hardware.

11. The method as claimed in claim 10, wherein the learning model is applied with the NDE/NDT hardware for implementing an NDE/NDT process.

12. The method as claimed in claim 11, wherein the NDE/NDT process is one or more of a radiography testing, an ultrasonic phased array imaging, a liquid penetrant testing, a magnetic particle testing, and an active infrared imaging.

13. The method as claimed in claim 11, wherein the NDE/NDT process is implemented using an NDE/NDT transducer that is one or more of an ultrasonic transducer and a phased array probe.

14. The method as claimed in claim 1, wherein the priori data is a computer-aided design (CAD) model.

15. The system as claimed in claim 5, wherein the one or more variables comprises at least one of instrument noise, transducer sensitivity variations, expected defect morphologies, and precision and accuracy of the measurement.

16. The system as claimed in claim 5, wherein the system is connected to a non-destructive evaluation/testing (NDE/NDT) hardware, and wherein the system is configured to integrate the learning model with the NDE/NDT hardware.

17. The system as claimed in claim 16, wherein the learning model is applied with the NDE/NDT hardware for implementing an NDE/NDT process.

18. The system as claimed in claim 17, wherein the NDE/NDT process is one or more of a radiography testing, an ultrasonic phased array imaging, a liquid penetrant testing, a magnetic particle testing, and an active infrared imaging.

19. The system as claimed in claim 17, wherein the system and the NDE/NTE hardware are both connected to a NDE/NDT transducer, and wherein the NDE/NDT process is implemented using the NDE/NDT transducer that is one or more of an ultrasonic transducer and a phased array probe.

20. The system as claimed in claim 5, wherein the priori data is a computer-aided design (CAD) model.

* * * * *